US012705152B2

(12) United States Patent
Panse et al.

(10) Patent No.: US 12,705,152 B2
(45) Date of Patent: Aug. 11, 2026

(54) METHODS AND APPARATUS TO MANAGE ENDPOINT PERFORMANCE

(71) Applicant: Intel Corporation, Santa Clara, CA (US)

(72) Inventors: Vrukesh Panse, Bangalore (IN); Rajaram Regupathy, Bangalore (IN); Subrata Banik, Bangalore (IN); Vincent Zimmer, Issaquah, WA (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 17/485,320

(22) Filed: Sep. 24, 2021

(65) Prior Publication Data

US 2022/0012150 A1 Jan. 13, 2022

(51) Int. Cl.

| | |
|---|---|
| ***G06F 1/00*** | (2006.01) |
| ***G06F 8/65*** | (2018.01) |
| ***G06F 11/07*** | (2006.01) |
| ***G06F 11/14*** | (2006.01) |
| ***G06F 11/30*** | (2006.01) |

(52) U.S. Cl.

CPC ............ *G06F 11/3058* (2013.01); *G06F 8/65* (2013.01); *G06F 11/0757* (2013.01); *G06F 11/1417* (2013.01)

(58) Field of Classification Search

CPC ..... G06F 11/3056; G06F 8/65; G06F 11/0757

See application file for complete search history.

(56) References Cited

U.S. PATENT DOCUMENTS

| | | | | |
|---|---|---|---|---|
| 8,386,618 | B2 | 2/2013 | Bailey et al. | |
| 8,594,850 | B1 * | 11/2013 | Gourlay | H04L 67/34 165/203 |
| 8,607,040 | B2 | 12/2013 | Zimmer et al. | |
| 8,977,871 | B2 | 3/2015 | Tang et al. | |
| 9,798,534 | B1 * | 10/2017 | Yi | G06F 11/1076 |
| 10,394,542 | B1 * | 8/2019 | Poenaru | G06F 3/0607 |
| 10,807,545 | B2 * | 10/2020 | Lei | B60R 16/0237 |
| 2004/0153724 | A1 * | 8/2004 | Nicholson | G06F 11/0709 714/E11.133 |
| 2008/0086652 | A1 * | 4/2008 | Krieger | G06F 8/65 713/330 |
| 2009/0007091 | A1 * | 1/2009 | Appiah | G06F 8/658 717/171 |

(Continued)

OTHER PUBLICATIONS

Shah, "Dell Offers Cheaper Quick-boot System Based on Flash Memory",retrieved from https://www.pcworld.com/article/515635/dell_flash_quickboot.html, on Feb. 3, 2022, 4 pages.

*Primary Examiner* — Mohammed H Rehman

(74) *Attorney, Agent, or Firm* — Hanley, Flight & Zimmerman, LLC

(57) ABSTRACT

Methods and apparatus for managing an endpoint device and associated updates are disclosed. An example apparatus includes circuitry to at least: query the endpoint device circuitry via the interface circuitry to obtain operating data associated with the endpoint device circuitry; determine an operating state of the endpoint device circuitry based on the operating data; when the operating state is not suitable for an update, trigger a save of a context of the endpoint device circuitry; and, when the operating state is suitable for the update, trigger installation of the update at the endpoint device circuitry.

18 Claims, 11 Drawing Sheets

(56) References Cited

U.S. PATENT DOCUMENTS

| | | | | |
|---|---|---|---|---|
| 2011/0055671 | A1* | 3/2011 | Kim | G11C 7/1069 365/194 |
| 2019/0277530 | A1* | 9/2019 | Schwegler | F24F 11/56 |
| 2020/0379747 | A1* | 12/2020 | Kaartinen | G06F 8/65 |
| 2022/0063585 | A1* | 3/2022 | Tabata | B60L 58/20 |
| 2022/0100596 | A1* | 3/2022 | Sherwin, Jr. | G06F 11/0712 |
| 2022/0391188 | A1* | 12/2022 | Sayyed | H04L 41/082 |
| 2023/0369659 | A1* | 11/2023 | Jung | G01K 1/026 |
| 2024/0037694 | A1* | 2/2024 | Suryanarayana | G06T 11/00 |

* cited by examiner

METHODS AND APPARATUS TO MANAGE ENDPOINT PERFORMANCE

FIELD OF THE DISCLOSURE

This disclosure relates generally to endpoint management, and, more particularly, to methods and apparatus to manage endpoint performance.

BACKGROUND

Updates are pushed from a central location to remote managed devices without regard to an environment or operating condition of the managed devices. As a result, a computing device can be triggered for an update in an environment and/or with an operating condition that is unsuitable for the update. The update can then result in a failure including corruption of data, corruption of software on the computing device, hardware damage to the computing device, and/or other failure resulting in loss of the computing device or a need for repair.

BRIEF DESCRIPTION OF THE DRAWINGS

The figures are not to scale. In general, the same reference numbers will be used throughout the drawing(s) and accompanying written description to refer to the same or like parts.

Figure 1:
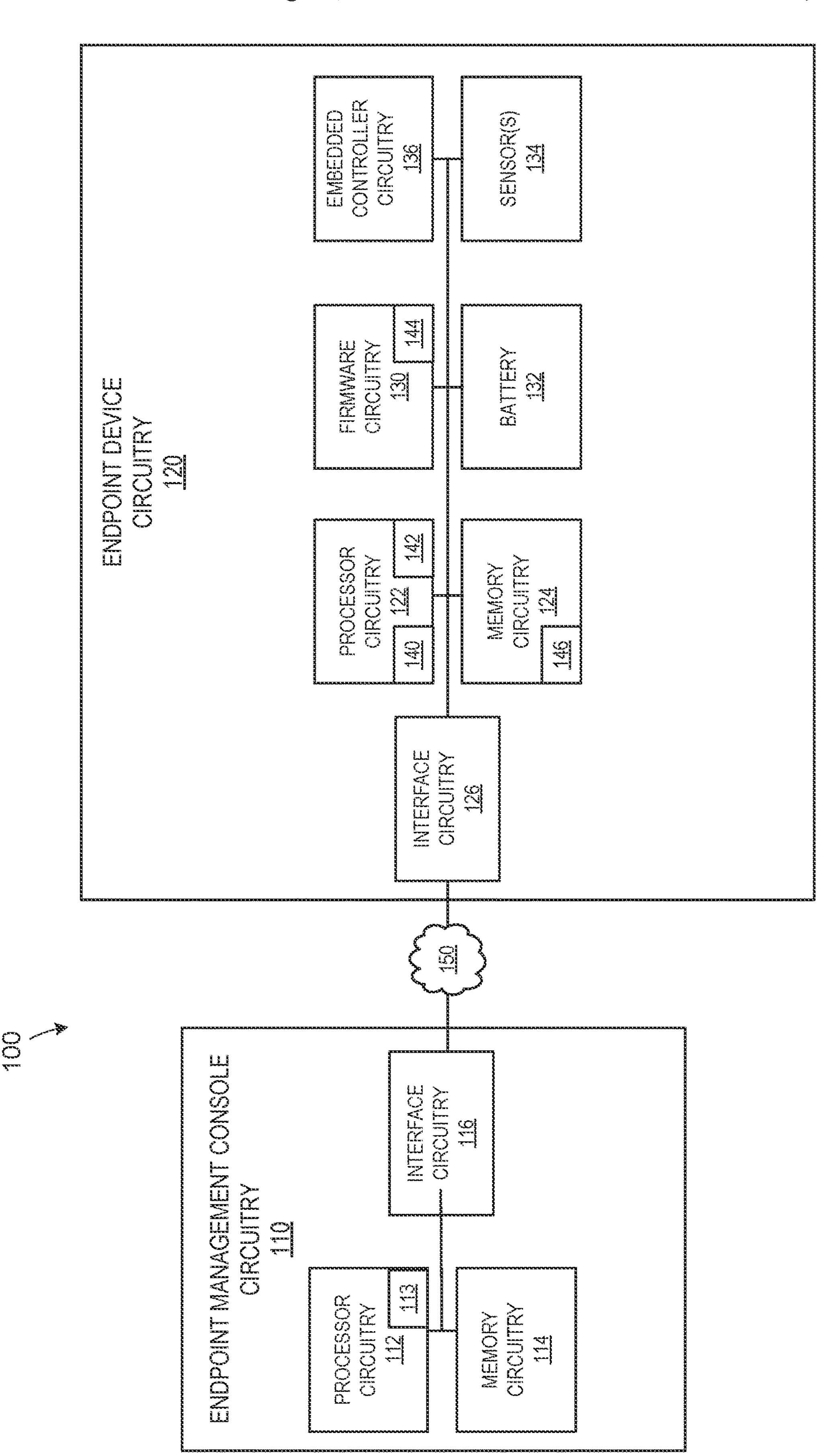
FIG. 1 is a schematic illustration of an example computing management system.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

Today's computing systems involve many local computing devices as well as interaction with remote computing devices. For example, local computing devices may utilize cloud-based services managed on enterprise client computing machines. Such systems involve periodic system updates provided from manageability centers and/or other remote computing devices. However, a remote update provider may have limited information about a local computing device to which an update is being pushed and/or may otherwise be unaware of an operating condition for the local computing device that is the target of an update. For example, power and temperature concerns (e.g., an available power threshold, a temperature limit, etc.) may factor into the availability of the local computing device to receive and/or install a software and/or firmware update. These limitations pose increasing challenges for hardware, software, and firmware manufacturers to help ensure a computing system has a capability to manage its thermal and power envelope for remote activation and update without impacting end user experience or damaging the computing device.

As such, certain examples improve resource usage and remote management of enterprise computing devices. Certain examples enable remote management of computing devices at a boot stage to help ensure proper update without sacrificing user experience. For example, a host-based firmware solution allows for improved observability of remote computing device behavior, application programming interface (API) consistency, improved performance, and cost savings.

In certain examples, a plurality of client enterprise computing devices is managed by a centralized or other remote computing device (e.g., a manageability center or server, etc.). The client computing devices may be powered down at night but can be activated (e.g., "woken up") to receive an update to the software and/or firmware of the respective client computing device. A client computing device can be awakened, provided with a patch and/or other update to install on the respective client computing device, and shut down again. Such a workflow can also be triggered for an antivirus scan and installation in response to a threat detection, recovery trigger, etc.

In certain examples, the client computing device may be unplugged, in a low power state, in a laptop bag or sleeve, etc. The power status and/or temperature of the client computing device may affect an ability of the device to activate, receive an update, and/or install/process the update. For example, the client computing device (e.g., a laptop or tablet computer, etc.) may overheat while downloading and installing an update as the device is in a storage sleeve or bag. Device power may fail or force the client computing device into a lower power or sleep state when trying to download and install an update with insufficient power available, for example. These and other conditions can negatively impact the client computing device, potentially damaging the device and/or at least rendering the client computing device unavailable for use for a period of time after the update. Even if sufficient power is available to download and install an update on a client computing device within an acceptable temperature range, remote update management may operate the client computing device in a recovery mode, in which thermal and power profiles for the client computing device are unmanaged. This lack of management can lead to faster battery depletion and inefficient resource usage. An overheated client computing device will exhaust the battery and trigger a critical shutdown or thermal trigger shutdown. Excessive heating near certain areas of a motherboard may even damage the computing device. At best, usage of system resources is ineffective and inefficient. At worst, the target client computing device is inoperable or unavailable for use. For at least these reasons, improved systems and methods to manage client computing devices and associated updates are needed.

In certain examples, a recovery may be triggered due to a boot device failure, etc. An operating system (OS) recovery (e.g., managed by system BIOS, etc.) may include an unmanaged thermal and power policy, which may keep the computing device in an active state without a user presence. By maintaining the computing device in an active state, a system battery may be exhausted and/or all or part of the computing device may overheat. An unmanaged computing device in an OS recovery state may trigger a shutdown when resources are exhausted, and lack of power results in a failure to restore the computing device to its previous operating state when the device resumes.

Certain examples provide an informed update framework for an endpoint console application programming interface (API). Such a framework enables thermal and power management of an endpoint device. The framework provides management of one or more endpoint computing and/or other electronic devices by monitoring and evaluating an operating condition (e.g., temperature, power, etc.) of the device(s). Based on the operating condition, an update can be implemented, interrupted, postponed, and/or scheduled for a later time. For example, detecting that a computing device is experiencing an abrupt thermal temperature increase triggers a deferral or rescheduling of an update for that computing device until another time. Similarly, a computing device entering into a manual recovery state for which a physical presence is to be involved can trigger deferral of an update to a later time, for example. The deferral can also trigger a save or preservation of current device and/or update context, state, etc., to enable faster, smoother resumption of the update and/or other device operation.

For example, an operating context of a computing device can be preserved in system memory with a suspend-to-RAM command, resulting in lower latency to restore the operating context of the computing device and provide a better user experience. The context can also be provided to an endpoint management console for more efficient management of connected devices. The management console can provide an out-of-band mechanism to query characteristics of computing devices in communication with the management console and determine policy action for applying updates to the computing device(s). Remote identification of a thermal, power, and/or other device issue triggering a deferral of an update and storage of device operating state/context reduces potential damage to the device, facilitates resumption/initiation of the update at another time, and helps to ensure higher quality of service (QoS) in the update. A plurality of endpoint devices, including a system on a chip (SoC), a laptop computer, a tablet computer, a cellular phone, a desktop computer, etc., can be managed without changes to BIOS or operating system infrastructure, for example.

Certain examples can also be applied in the context of threat detection technology and management. That is, when an intrusion is detected in a computing device, the computing device can initiate a recovery workflow. The recovery workflow allows for OS-absent authentication and verification and scanning to occur in a management domain. In such a workflow, a context can be saved and an update can be deferred to allow the computing device to manage the intrusion before an update is installed.

FIG. 1 is a schematic illustration of an example computing management system 100 including an endpoint management console circuitry 110 and an endpoint device circuitry 120. The example endpoint management console circuitry 110 includes processor circuitry 112, memory circuitry 114, and communication interface circuitry 116. The example processor circuitry 112 can include example operating system (OS) services 113 that can enable endpoint device circuitry 120 management, retrieve endpoint device 120 characteristics such as operating temperature, available power, charging status, etc. Such characteristics can also be referred to as operating data of the endpoint device circuitry 120.

The example endpoint device circuitry 120 includes processor circuitry 122, memory circuitry 124, communication interface circuitry 126, firmware circuitry 130, a battery 132, sensor(s) 134, and an embedded controller circuitry 136. The example processor circuitry 122 can include an example OS services 140, an example watchdog timer 142, etc. The example OS services 140 can include services, drivers (e.g., thermal driver, power driver, etc.), etc. The example firmware circuitry 130 can include an example bootloader or basic input/output system (BIOS) 144 for startup of the endpoint device circuitry 120, etc. The bootloader/BIOS 144 can include a thermal driver, a power driver, etc., to measure and/or otherwise manage temperature, available power, etc., of the endpoint device circuitry 120, for example. The example sensor(s) 134 can be used to measure one or more characteristics of the endpoint device circuitry 120 such as a temperature of the processing circuitry 122, a temperature of the endpoint device circuitry 120 as a platform, etc. The example embedded controller circuitry 136 enables interaction with the sensor(s) 134 and other endpoint device circuitry 120 to extract and/or otherwise obtain information (e.g., regarding temperature, available power, charging rate, etc.) to be provided to the example endpoint management console circuitry 110.

As shown in the example of FIG. 1, the example endpoint management console circuitry 110 is connected to the example endpoint device circuitry 120 via a network 150. The example network 150 can be a cloud-based network, a local area network, a wide area network, another wireless connection, a wired connection, etc. In certain examples, the network 150 provides cloud services for the endpoint management console circuitry 110 to extract information from and send instructions to the endpoint device circuitry 120 using an API, such as open API, etc.

In operation, the OS services 140 of the example endpoint device circuitry 120 communicate with the OS services 113 of the example endpoint management console circuitry 110 to provide information such as an operating temperature of all or part of the endpoint device circuitry 120, available power (e.g., stored in the battery 132 and/or being externally provided, etc.), charging rate, etc. The OS services 113 of the endpoint management console circuitry 110 communicates with the OS services 140 of the endpoint device circuitry 120 via the communication interface circuitry 116, 126 to provide remote in-band management to determine an operating state of the endpoint device circuitry 120. A command from the OS services 113 can communicate with the OS services 140 via the communication interface circuitry 116, 126 to wake all or part of the endpoint device circuitry 120.

The operating temperature can be captured by the sensor (s) 134, for example. The operating temperature information can be communicated using an API to specify information type, information format, etc. Other information or operating data such as multiple temperatures, battery level, charging status, etc., can be provided in an exchange between the OS services 140 and OS services 113 via the respective communication interface circuitry 116, 126. In certain examples, the firmware circuitry 130 and/or the embedded controller circuitry 136 enable communication with the sensor(s) 134, the battery 132, and/or other circuitry of the endpoint device circuitry 120 to allow sensor data, power status, and/or other information to be provided by the OS services 140 to the OS services 113 via the respective communication interface circuitry 116, 126.

Based on the information provided to OS services 113 of the endpoint device circuitry 120 via the communication interface circuitry 116, the example processor circuitry 112 can determine whether a boot condition (also referred to as a "critical" boot condition) exists at the endpoint device circuitry 120. For example, the processor circuitry 112 can evaluate temperature information from the endpoint device circuitry 120 to determine whether all or part of the endpoint device circuitry 120 is heating up to an unacceptable temperature level. As another example, the processor circuitry 112 can evaluate an available power level (alone or in combination with charging status, etc.) to determine whether sufficient power is available for download and/or installation of an update at the endpoint device circuitry 120.

When a boot condition is identified, then the endpoint management console circuitry 110 (e.g., the processor circuitry 112 and its OS services 113) can manage an update in response to detection of the boot condition. If an update is scheduled but not yet begun, then determination of the boot condition may result in delay of the update. For example, if an update is to be downloaded but has not yet begun, determination of an elevated temperature or a low power state of all or part of the endpoint device circuitry 120 may result in rescheduling or other delay in the downloading and installation of the update. If an update has been downloaded but has not yet begun to install, determination of an elevated temperature or a low power state of all or part of the endpoint device circuitry 120 may result in rescheduling or other delay in the installation of the update, for example.

If installation of an update has begun but is not yet complete, determination of an elevated temperature or a low power state of all or part of the endpoint device circuitry 120 may result in installation and/or triggering of the watchdog timer 142. The watchdog timer 142 is registered with the OS services 140 and can be used to count down and track progress of the update. Update progress can be used with measurement of increasing temperature and/or decreasing power to trigger a pause or halt of the update and a saving of associated state to resume at a later time (e.g., after the temperature has decreased below a warning threshold level, once available power has increased above an acceptable threshold level, etc.).

In certain examples, upon expiration of a duration set with the watchdog timer 142, all or part of the endpoint device circuitry 120 may enter a power savings or sleep mode, pausing any update and awaiting user action to wake or resume the endpoint device circuitry 120 and trigger a resumption or reset of the update. In certain examples, as a duration of the watchdog timer 142 nears expiration or when the duration expires, state information can be saved in the memory circuitry 124 for all or part of the endpoint device circuitry 120, the update, etc., to enable a "wake and update" or "wake and resume update" configuration. In certain examples, a flag or status can be set in the firmware circuitry 130 (e.g., in connection with the BIOS or bootloader 144) to enable the commencement or resumption of the update once the endpoint device circuitry 120 is resumed or restarted without the boot condition (e.g., temperature, power, etc.) that triggered the sleep or savings mode/state. By leveraging the bootloader 144, an update recovery triggers a check of endpoint device circuitry 120 status (e.g., temperature, power, etc.) whereas the bootloader 144 would otherwise be unaware of endpoint device circuitry 120 information such as temperature, power, thermal and/or power management policies, etc. By involving the firmware circuitry 130, in a pre-OS, pre-boot sequence, boot conditions such as temperature, power, etc., can be evaluated and accommodated before problems are created in an update that could damage the device 120 (e.g., through thermal damage from a high temperature, unsaved information from a power failure, etc.).

Figure 2:
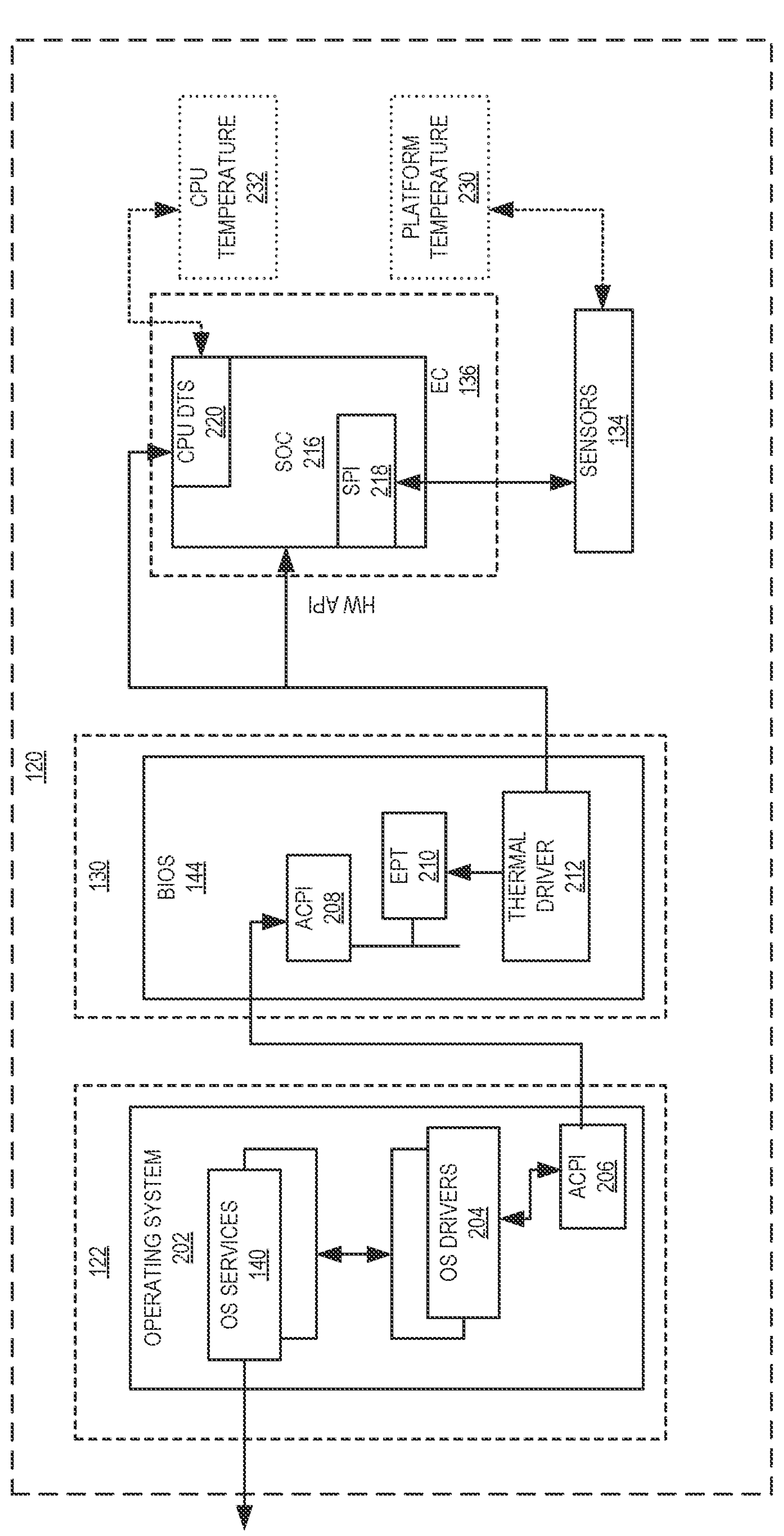
FIG. 2 is an example implementation of a portion of the example computing management system of FIG. 1.

FIG. 2 illustrates an example implementation of a subset of the example computing management system 100 of FIG. 1. The example of FIG. 2 illustrates an interaction between an OS 202, the BIOS/bootloader 144, the sensors 134, the embedded controller (EC) circuitry 136, and additional hardware of the example processor circuitry 122.

As shown in the example of FIG. 2, the OS services 140 and OS drivers 204 drive interaction with the BIOS 144 via connected interfaces 206, 208, such as advanced configuration and power interfaces (ACPIs) 206, 208, to obtain an endpoint temperature (EPT) value 210 from the BIOS 144 of the firmware circuitry 130. The EPT 210 is obtained from a thermal driver 212 forming part of the BIOS 144. The thermal driver 212 interacts with the embedded controller circuitry 136 to gather information from the sensor(s) 134. The example implementation of the embedded controller circuitry 136 shown in FIG. 2 includes a system on a chip (SoC) 216, which includes a serial peripheral interface (SPI) 218 (e.g., an enhanced serial peripheral interface (eSPI), etc.) and a digital thermal sensor (DTS) 220 (e.g., a central processing unit (CPU) DTS, etc.). The SPI 218 enables the embedded controller circuitry 136 to read a temperature, such as a platform temperature 230, etc., from the sensor(s) 134. The DTS 220 gathers a specific component temperature such as a CPU temperature 232, etc.

As such, the platform temperature 230 and the CPU temperature 232 can be provided from the embedded controller circuitry 136 to the thermal driver 212 of the BIOS/bootloader 144. The thermal driver 212 communicates with the OS driver(s) 204 via ACPIs 206, 208 to convey the temperature data 230, 232. The OS driver(s) 204 provide the temperature data 230, 232 to the OS services 140. The OS service(s) leverage the communication interface circuitry 126, 116 to provide the temperature data 230, 232 to the OS services 113 of the endpoint management console circuitry 110. The OS services 113 leverage the temperature data 230, 232 to determine whether the example endpoint device circuitry 120 is operating too hot (e.g., higher than a threshold temperature determined to avoid damage to circuitry of the example endpoint device circuitry 120, etc.) to execute an update at the endpoint device circuitry 120.

Figure 3:
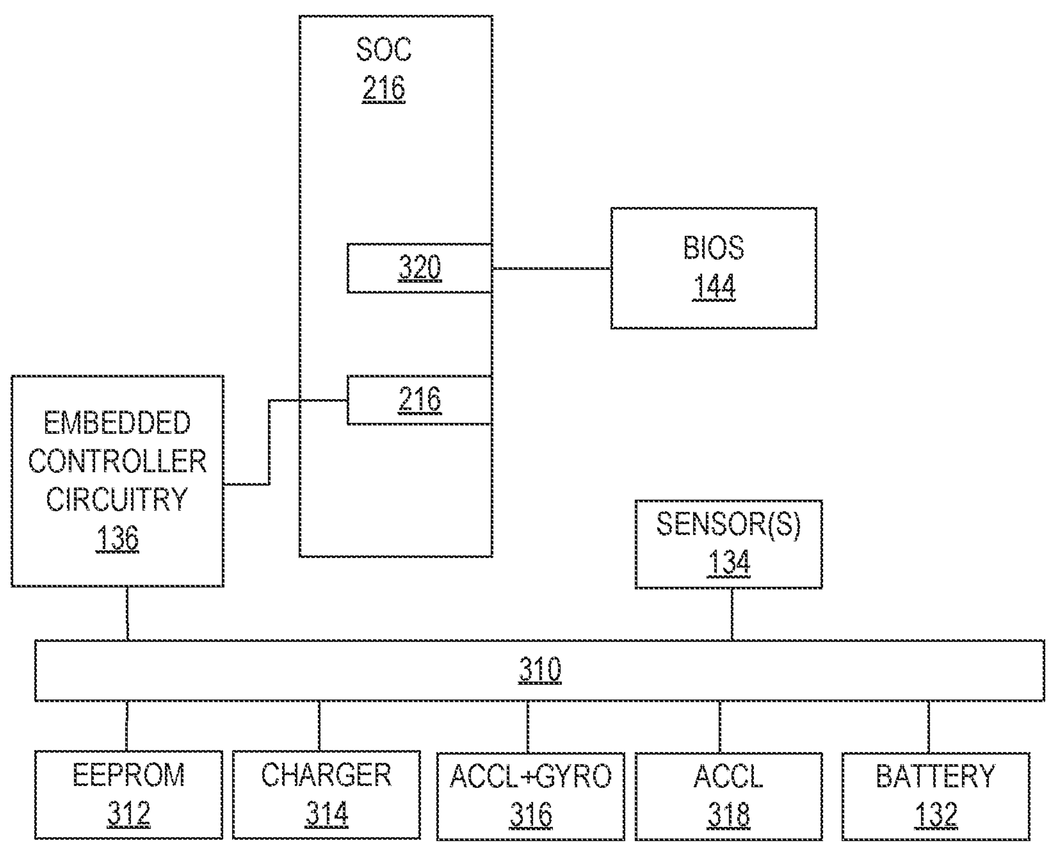
FIG. 3 is an example alternative implementation of a portion of the example computing management system of FIG. 1.

FIG. 3 illustrates an example alternative implementation in which the SoC 216 is implemented in the example endpoint device circuitry 120 apart from the embedded controller circuitry 136, which can also be implemented as sensor hub circuitry for the sensors 134 and one or more additional circuits 310. As shown in the example of FIG. 3, the embedded controller circuitry 136 can communicate with a plurality of devices such as the battery 132, sensor(s) 134, an electrically erasable programmable read-only memory (EEPROM) 312, a battery charger 314, an accelerometer with gyroscope 316, an accelerometer 318, and/or other circuitry included in and/or associated with the endpoint device circuitry 120. Information gathered by the embedded controller circuitry 136 can be used by the endpoint management console circuitry 110 to determine or predict an operating state of the endpoint device circuitry 120 to generate one or more control instructions to drive or delay an update at the endpoint device circuitry 120, for example.

Using temperature information, battery level, and activity from one or more of the connected circuits 312-318, the endpoint management console circuitry 110 can determine whether a boot condition such as a thermal critical condition (e.g., near or over a threshold temperature, etc.), battery threshold (e.g., 50%, etc.), etc., exists that would or is likely to prevent the endpoint device circuitry 120 from sustaining a duration of an update. When the processor circuitry 112 of the endpoint management console circuitry 110 determines that the endpoint device circuitry 110 is able to support an update, the processor circuitry 112 leverages the OS services 113 to trigger the update at the endpoint device circuitry 120. When the processor circuitry 112 of the endpoint management console circuitry 110 determines that the endpoint device circuitry 110 is unable (or at least likely to be unable) to support the update, the processor circuitry 112 leverages the OS services 113 to postpone the update, stop an update in progress, etc. If the update is to be delayed or halted, the OS services 113 engage the OS services 140 to save state information of the endpoint device circuitry 120 to resume the update when a condition of the endpoint device circuitry 120 allows (e.g., when the temperature has decreased, power level has increased, etc.).

Figure 4:
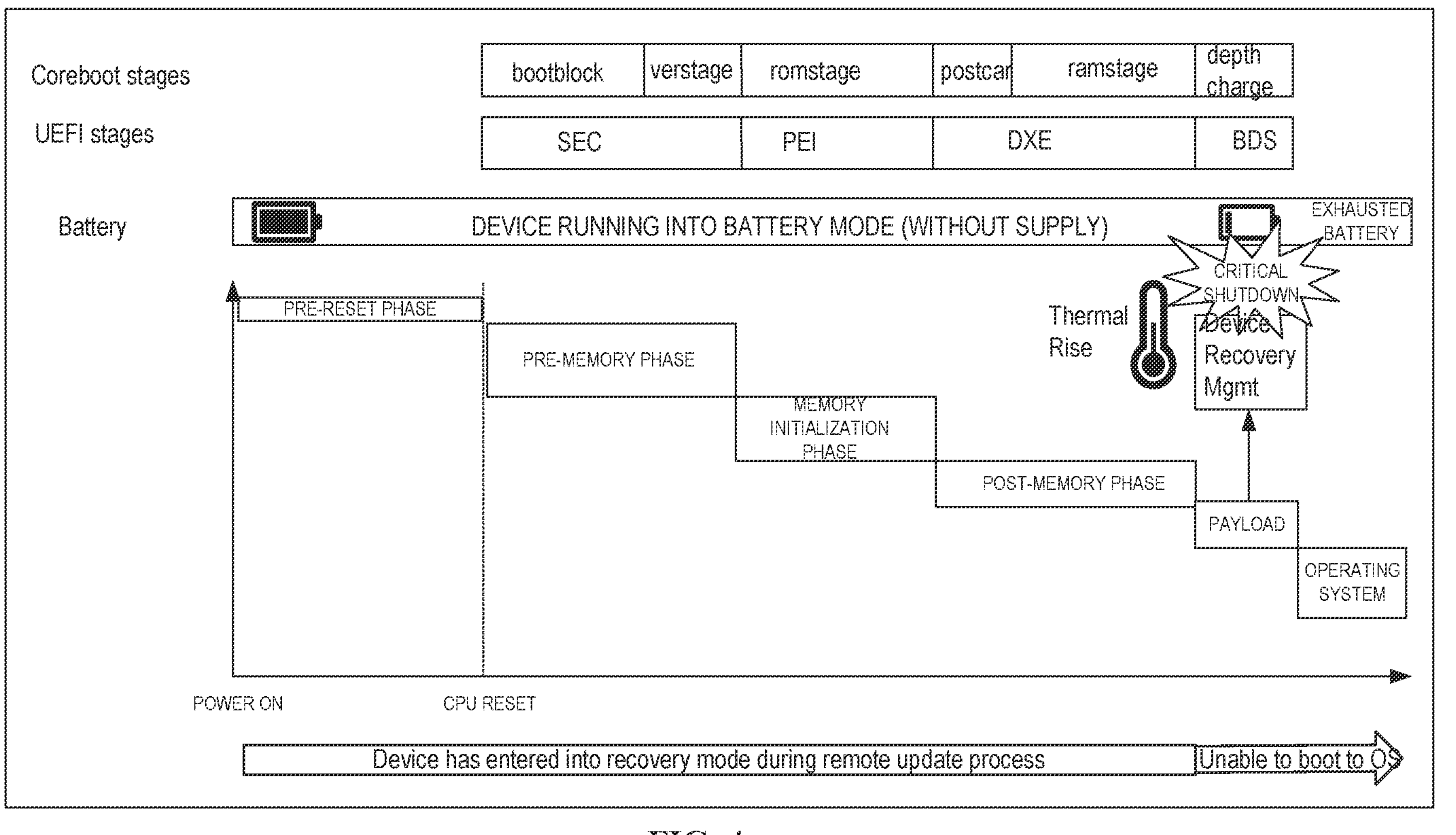
FIG. 4 illustrates a prior recovery boot sequence.

As such, the example endpoint device management console circuitry 110 works with the example endpoint device circuitry 120 to improve an update process and to improve a system recovery boot flow when an update is interrupted or postponed due to a boot condition. For example, FIG. 4 shows a prior system recovery boot flow executed during an update according to prior systems not benefiting from the improved circuitry and capabilities set forth herein. As shown in the example of FIG. 4, a pre-reset phase is triggered by power-on of a device running on battery power. Core boot stages are executed in conjunction with unified extensible firmware interface (UEFI) stages to boot or reboot a device following an update. In a pre-memory phase, as the bootloader executes a boot block and read/write verification (verstage), the UEFI executes a security phase (SEC). In a memory initialization phase, the core boot executes a read-only memory (ROM) stage while the UEFI executes a pre-EFI initialization stage (PEI). In a post-memory phase, the core boot executes a post-cache as ram setup stage (postcar) and random-access memory (RAM) stage, and the UEFI executes a drive execution environment (DXE) stage. In a payload phase, device recovery is to be implemented as a boot device is selected (BDS) and the device is initialized for boot (depthcharge).

In such prior approaches, the payload was responsible for recovery management of the device and represents the last stage in the system firmware boot process before handing off operation to the OS. However, as shown in the prior example of FIG. 4, when the battery is exhausted and device temperature rises, the device is unable to complete the boot/startup process and boot to the operating system. Instead, the device experiences a critical shutdown and may lose state information, update progress, etc., and/or suffer damage from the heat and/or battery failure. The payload does not include thermal and/or power management policies to foresee the periodic rise in platform thermal condition. The pre-boot stage does not include passive or active cooling policies or recognition of a thermal threshold. These deficiencies also impact system battery usage. Rising temperature and/or battery depletion trigger an abrupt shutdown from which a remote platform is unable to restore the device or complete the update.

Additionally, a drain of the battery will render the device inoperable for a user. The battery may be damaged. An abruptly interrupted update may damage the system, resulting in an inoperable device.

Figure 5:
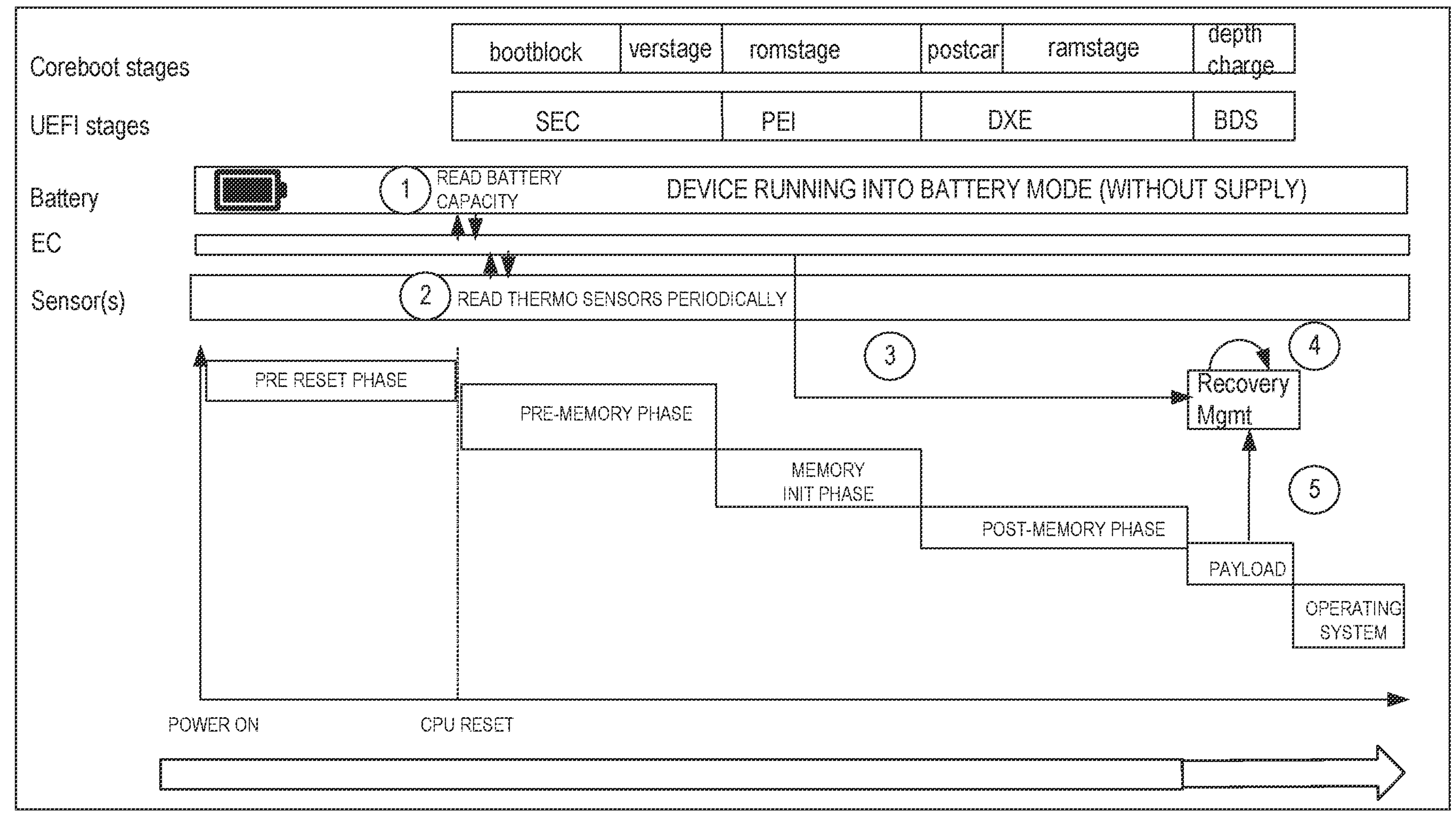
FIG. 5 illustrates an improved recovery boot sequence.

FIG. 5 illustrates an example improved recovery flow to be executed during an update to allow the endpoint device circuitry 120 (and the endpoint management console circuitry 110) to react in the event of a boot condition that interrupts the update. As shown in the example of FIG. 5, at 1, the embedded controller circuitry 136 reads battery capacity from the battery 132. At 2, the embedded controller circuitry 136 is also reading temperature from the thermal sensors 134. At 3, the embedded controller circuitry 136 communicates battery capacity and temperature information to the BIOS/bootloader 144 so that the firmware circuitry 130 is aware of battery capacity and temperature as it executes the phases of recovery mode during a remote update process. At 4, the watchdog timer 142 is started to detect presence of a user. Upon expiration of the watchdog timer 142, device recovery management puts the endpoint device circuitry 120 into a self-refresh mode. Operating context is saved in the memory circuitry 124 (e.g., in a boot script table 146), and trigger system recovery in a low power mode. At 5, when a user presence is detected, a boot script table is executed to advance to a saved stage (e.g., based on context information previously saved in the boot script table, etc.) without running an entire boot flow. As such, the recovery process during and/or after an update can proceed to the operating system or can be put safely into a low power mode to wait for user interaction if battery and/or temperature information indicates a likelihood of an impending boot condition that would interfere with the completion of the update and restart of the endpoint device circuitry 120.

In certain examples, the watchdog timer 142 can start with a preset and/or other configured value, and a recovery screen can be displayed on the endpoint device circuitry 120 (e.g., via the example interface circuitry 126). When a user verifies its presence (e.g., via the recovery screen) before the watchdog timer 142 expires, then the watchdog timer 142 is disabled and a boot kernel executes to resume normal operation. However, when the watchdog timer 142 expires, the endpoint device circuitry 120 enters a low power mode to reduce a thermal condition of the endpoint device circuitry 120 and preserve battery power.

In low power mode, a temperature measured by the sensor(s) 134 of the endpoint device circuitry 120 can be reduced (e.g., via passive cooling). Saving a state or context in association with the low power mode allows the endpoint device circuitry 120 to restart with less latency as well. In certain examples, register and/or other state/context information for the endpoint device circuitry 120 can be stored in the boot script table 146 in the memory circuitry 124. The memory circuitry 124 is placed in a self-refresh mode, and the boot script table 146 can be stored in a location such as a scratch pad register, non-volatile memory location, etc., to maintain its context. When operation resumes, the firmware circuitry 130 locates the boot script table 146 from a saved address and restores hardware registers and/or other context information to the saved state without a complete reset and reinitialization. Operations, such as completion of an update and/or resumption of other computing activity, can proceed with reduced latency (e.g., one-third the latency of a complete reset and reinitialization, etc.).

As described above, prior approaches resulted in a remote system pushing updates without knowing an operating condition or surrounding environment of an endpoint device. Additionally, recovery triggered during remote management of an endpoint device for an update forces the endpoint device to remain in an active state prior to activation of the OS and without power and/or thermal management, which can result in an adverse effect to the endpoint device, such as loss of data, failure in hardware, failure in software, etc.

Figure 6:
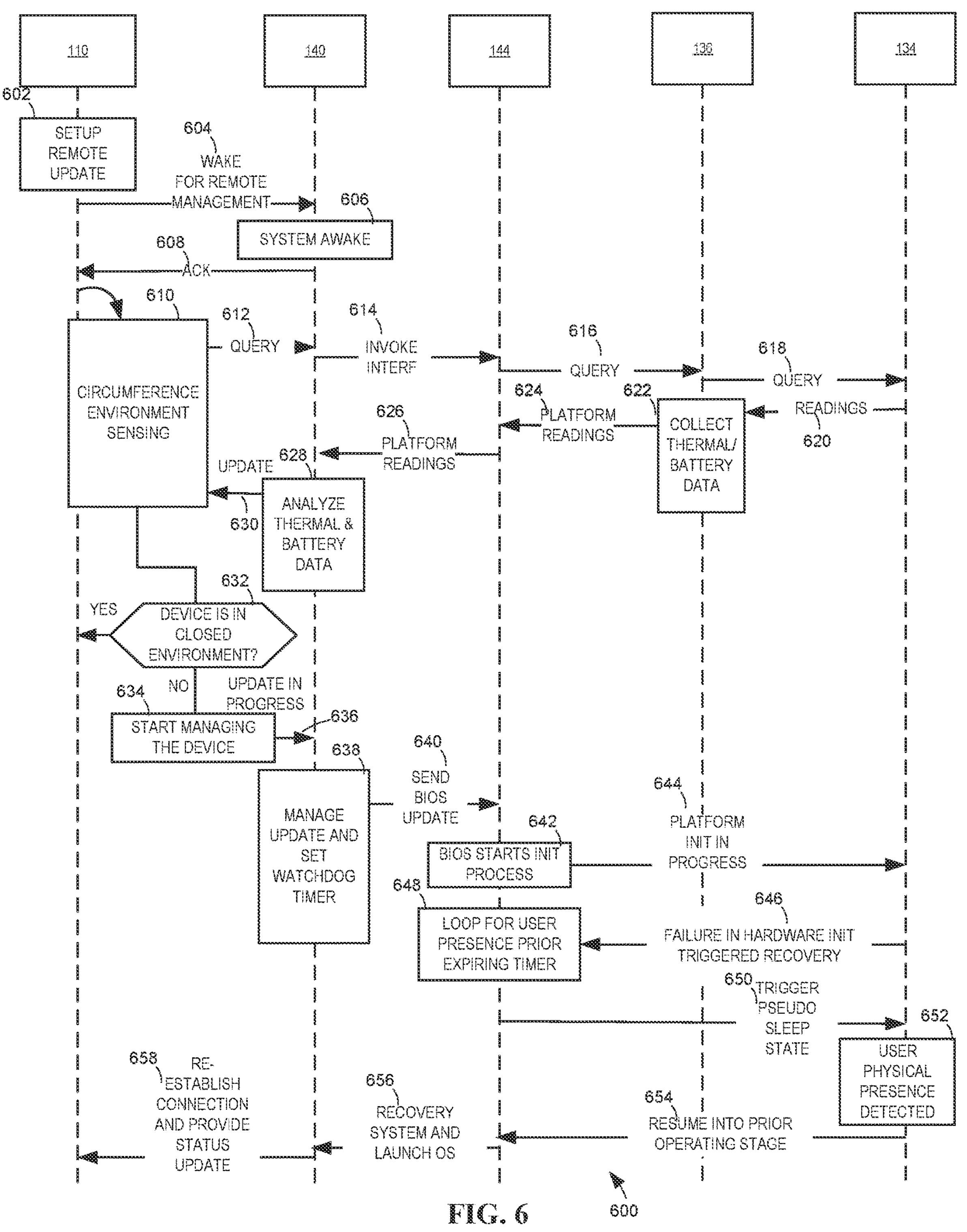
FIG. 6 shows an example data and instruction control flow to manage an update at the example endpoint device circuitry of FIG. 1 via the example endpoint management console circuitry of FIG. 1.

FIG. 6 illustrates an example data and instruction control flow 600 to manage an update at the endpoint device circuitry 120 via the endpoint management console circuitry 110 by extrapolating a determination of a surrounding environment of the endpoint device circuitry 120 from its operating data such as temperature information, battery information, etc. At 602, the endpoint management console circuitry 110 triggers setup for a remote update of the endpoint device circuitry 120. At 604, the OS services 140 of the endpoint device circuitry 120 receive a wake command or instruction for remote management by the OS services 113 of the endpoint console management circuitry 110. At 606, the endpoint device circuitry 120 is awake, and, at 608, sends an acknowledgement back to the OS services 113 of the endpoint console management circuitry 110.

At 610, the endpoint management console circuitry 110 gathers and processes information to determine an operating or circumference (e.g., surrounding) environment of the endpoint device circuitry 120. At 612, the endpoint management console circuitry 110 queries the OS services 140 for thermal and battery information. At 614, interface (e.g., ACPI, etc.) methods are invoked by the OS services 140 to prompt the BIOS 144 to, at 616, query the embedded controller circuitry 136 for operating data such as thermal/temperature and battery information. At 618, the embedded controller circuitry 136 queries the battery 132, the sensor(s) 134, and/or other connected circuit to obtain temperature and battery measurements, etc. At 620, thermal and battery readings are provided to the embedded controller circuitry 136, which, at 622, collects the thermal and/or battery information.

At 624, the thermal/battery data is provided to the BIOS 144, which, at 626, provides the thermal/battery data to the OS services 140. At 628, the OS services 140 analyzes the thermal/battery information. In certain examples, the analysis is done in conjunction with the OS services 113 or is done by the OS services 113 instead of the OS services 140. At 630, the endpoint management console circuitry 110 is updated with the thermal and/or power information (and associated analysis). At 632, the processor circuitry 112 of the endpoint management console circuitry 110 processes the thermal/battery information to determine whether the endpoint device circuitry 120 is in a closed environment. For example, a power decrease and a temperature increase may indicate that the endpoint device circuitry 120 has been activated while unplugged and stored in a bag, a compartment, etc. When the endpoint device circuitry 120 is determined to be operating in a closed environment, then the endpoint management console circuitry 110 ends remote management of the endpoint device circuitry 120 before beginning the update. When the endpoint device circuitry 120 is determined not be operating in a closed environment, then, at 634, remote management of the endpoint device circuitry 120 by the endpoint management console circuitry 110 commences.

At 636, an update is provided to and/or otherwise initiated at the endpoint device circuitry 120. At 638, the OS services 140 manage the update and set the watchdog timer 142. At 640, the OS services 140 send the update to the BIOS 144. At 642, the BIOS 144 starts an initialization process for the update. At 644, the initialization is in progress. At 646, a reading in the sensor(s) 134 and/or other circuitry (e.g., the battery 132, etc.) indicates a failure in hardware initialization (e.g., temperature above threshold, power below threshold, etc.) which triggers a recovery mode. At 648, the BIOS 144 looks for user interaction/input until the watchdog timer 142 expires. When no user presence is detected, at 650, a low power or pseudo-sleep state or mode (e.g., suspend-to-RAM) is triggered for all or part of the endpoint device circuitry 120. Entry into the pseudo-sleep state includes storage of context and/or other operating state information in the memory circuitry 124, such as in the boot script table 146 in the memory circuitry 124.

The endpoint device circuitry 120 operates in the pseudo-sleep state until user presence/activity is detected at 652. At 654, the endpoint device circuitry 120 then resumes its prior operating state or stage of booting. Such resumption of boot is enabled through retrieval of information stored in the memory circuitry 124, such as in the boot script table 146 in the memory circuitry 124, for example. At 656, system recovery is completed by the BIOS 144, which then launches the OS and its OS services 140. At 658, a connection with the endpoint management console circuitry 110 is re-established, and the OS services 140 provides an indication of update and device status to the OS services 113 of the endpoint management console circuitry 110.

While an example manner of implementing the system 100 of FIG. 1 is illustrated in FIGS. 2-3, one or more of the elements, processes, and/or devices illustrated in FIGS. 1-3 may be combined, divided, re-arranged, omitted, eliminated, and/or implemented in any other way. Further, the example processor circuitry 112, the example memory circuitry 114, the example communication interface circuitry 116, and/or, more generally, the example endpoint management console circuitry 110 of FIG. 1, may be implemented by hardware, software, firmware, and/or any combination of hardware, software, and/or firmware. Thus, for example, any of the example processor circuitry 112, the example memory circuitry 114, the example communication interface circuitry 116, and/or, more generally, the example endpoint management console circuitry 110, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example processor circuitry 112, the example memory circuitry 114, and/or the example communication interface circuitry 116 is/are hereby expressly defined to include a non-transitory computer readable storage device or storage disk such as a memory, a digital versatile disk (DVD), a compact disk (CD), a Blu-ray disk, etc., including the software and/or firmware. Further still, the example endpoint management console circuitry 110 of FIG. 1 may include one or more elements, processes, and/or devices in addition to, or instead of, those illustrated in FIG. 1, and/or may include more than one of any or all of the illustrated elements, processes and devices.

Further, the example processor circuitry 122, the example memory circuitry 124, the example communication interface circuitry 126, the example firmware circuitry 130, the example embedded controller circuitry 136, and/or, more generally, the example endpoint device circuitry 120 of FIG. 1, may be implemented by hardware, software, firmware, and/or any combination of hardware, software, and/or firmware. Thus, for example, any of the example processor circuitry 122, the example memory circuitry 124, the example communication interface circuitry 126, the example firmware circuitry 130, the example embedded controller circuitry 136, and/or, more generally, the example endpoint device circuitry 120, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example processor circuitry 122, the example memory circuitry 124, the example communication interface circuitry 126, the example firmware circuitry 130, and/or the example embedded controller circuitry 136 is/are hereby expressly defined to include a non-transitory computer readable storage device or storage disk such as a memory, a digital versatile disk (DVD), a compact disk (CD), a Blu-ray disk, etc., including the software and/or firmware. Further still, the example endpoint device circuitry 120 of FIG. 1 may include one or more elements, processes, and/or devices in addition to, or instead of, those illustrated in FIG. 1, and/or may include more than one of any or all of the illustrated elements, processes and devices.

Figure 7:
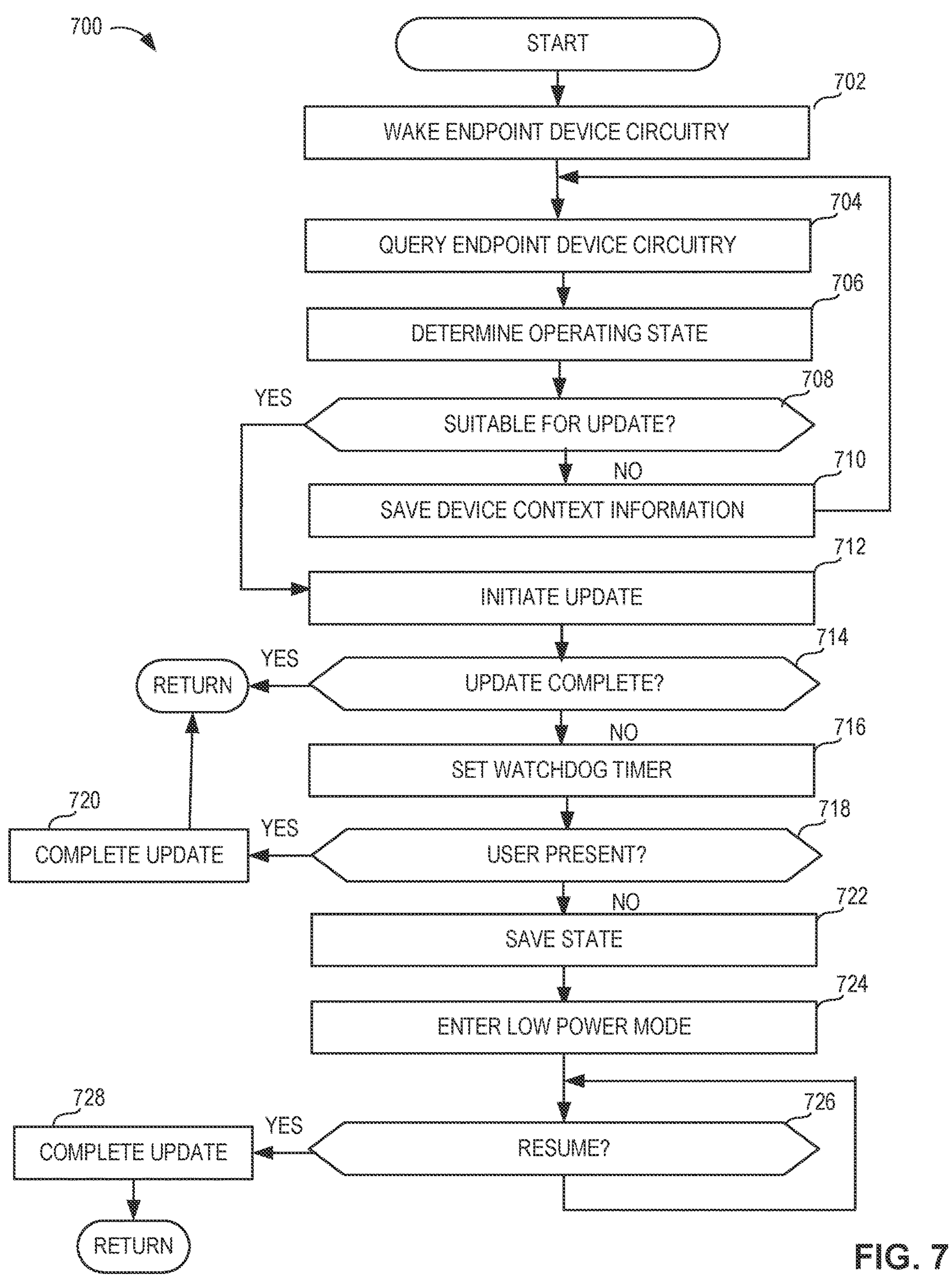
FIG. 7 is a flowchart representative of example machine readable instructions and/or example operations that may be executed and/or instantiated by processor circuitry to manage an update of an endpoint device circuitry.

A flowchart representative of example hardware logic circuitry, machine readable instructions, hardware implemented state machines, and/or any combination thereof for implementing the apparatus 100 of FIGS. 1-4 is shown in FIG. 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)

gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example apparatus 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to manage an update of an endpoint device circuitry 120. The machine readable instructions and/or operations 700 of FIG. 7 begin at block 702, at which the endpoint device circuitry 120 is awakened (e.g., by a message to the OS services 140 from the OS services 113). At block 704, the OS services 113 queries the OS services 140 of the endpoint device circuitry 120 for information regarding operation of the endpoint device circuitry 120, such as temperature, battery power, charging rate, other operating data, etc.

At block 706, based on the operating data/information retrieved from the endpoint device circuitry 120, the processor circuitry 112 of the endpoint management console circuitry 110 determines an operating state of the endpoint device circuitry 120 (e.g., the device circuitry 120 is overheating, has low power, has a normal temperature, has sufficient power to install an update, is operating in an enclosed space, etc.). At block 708, the operating state is evaluated (e.g., by the OS services 113 and/or other processor circuitry 112, processor circuitry 122, BIOS 144, etc.) to determine whether the operating state of the endpoint device circuitry 120 is suitable to install an update. For example, the operating state is evaluated to determine whether a temperature of all or part of the endpoint device circuitry 120, When the operating state is not suitable for an update, at block 710, context information for the endpoint device circuitry 120 is saved (e.g., in the boot script table 146 in the memory circuitry 124, etc.). Then control reverts to block 704 to gather new information from the endpoint device circuitry 120 to determine whether the operating state is suitable to support an update.

When the operating state is suitable to support an update, at block 712, the update of the endpoint device circuitry 120 is initiated. For example, interaction between the OS services 113, 140 downloads, streams, and/or triggers installation of an already-installed update at the endpoint device circuitry 120. At block 714, when the update is complete, then the process ends. However, when the update is ongoing, then, at block 716, the watchdog timer 142 is installed and/or otherwise set with a value (e.g., a time, a number of cycles, etc.). The value can be set based on an operating or boot condition of the endpoint device circuitry 120, such as battery power remaining, difference between a temperature of all or part of the endpoint device circuitry 120 and a temperature threshold, etc.

Once the watchdog timer 142 has counted to/from its value, at block 718, user presence is examined. For example, an interaction with an interface of the endpoint device circuitry 120 (e.g., a mouse, a keyboard, a touchscreen, a power button, a biometric scanner, etc.) is monitored to identify a user interaction. When a user presence is detected, then, at block 720, the update completes.

When a user presence is not detected, then, at block 722, a state and/or other context information of the endpoint device circuitry 120 is saved. For example, a status/state/progress of the update is saved in the boot script table 146 and/or other data structure in the memory circuitry 124 (e.g., by the OS services 140 and/or the BIOS/bootloader 144, etc.). Other information such as register values, boot progress, etc., can be saved in the boot script table 146. At block 724, the endpoint device circuitry 120 enters a low power or recovery mode (e.g., triggered by the BIOS 144, the processor circuitry 122, etc.). In such a mode, activity is reduced, eliminated, or suspending to preserve battery power, lower a temperature of the endpoint device circuitry 120, prevent corruption of data, etc., at the endpoint device circuitry 120. At block 726, the endpoint device circuitry 120 operates in the low power mode (e.g., via the BIOS 144, etc.) until normal operation resumes. Normal operation can resume based on a recharging of the battery 132 above a battery or power threshold level, connection of the endpoint device circuitry 120 to an external power source, decrease of a temperature registered by the sensor(s) 134 below a temperature threshold, user interaction with the endpoint device circuitry 120, etc. Once the endpoint device circuitry 120 has resumed normal operation and/or otherwise advanced out of the low power/recovery state, at block 728, the update is complete. Control then returns to normal operation of the endpoint device circuitry 120.

Figure 8:
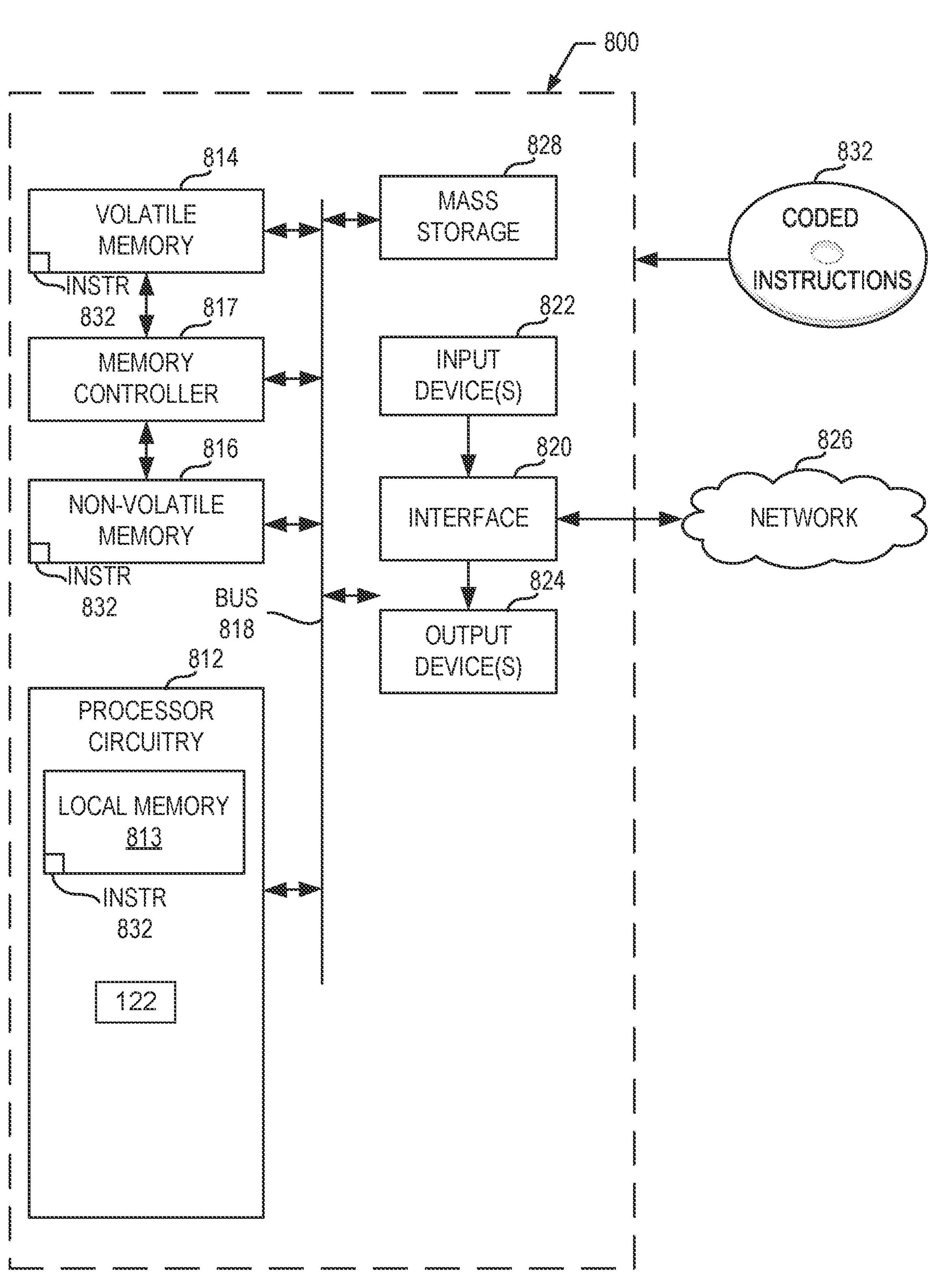
FIG. 8 is a block diagram of an example processor platform structured to execute and/or instantiate the machine readable instructions and/or operations of FIG. 7 to implement the apparatus of FIGS. 1-3.

FIG. 8 is a block diagram of an example processor platform 800 structured to execute and/or instantiate the machine readable instructions and/or operations of FIG. 7 to implement the apparatus of FIGS. 1-3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example processor circuitry 122. The example processor circuitry 812 can also implement the example processor circuitry 112.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. The main memory 814, 816 and the memory controller 817 can be used to implement the example memory circuitry 114 and/or the example memory circuitry 124, for example.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. The interface circuitry 820 can be used to implement the example interface circuitry 116 and/or the example interface circuitry 126, for example.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826 (e.g., the example network 150, etc.). The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIG. 7, may be stored in the mass storage device 828, in the volatile memory 814, in the non-volatile memory 816, and/or on a removable non-transitory computer readable storage medium such as a CD or DVD.

Figure 9:
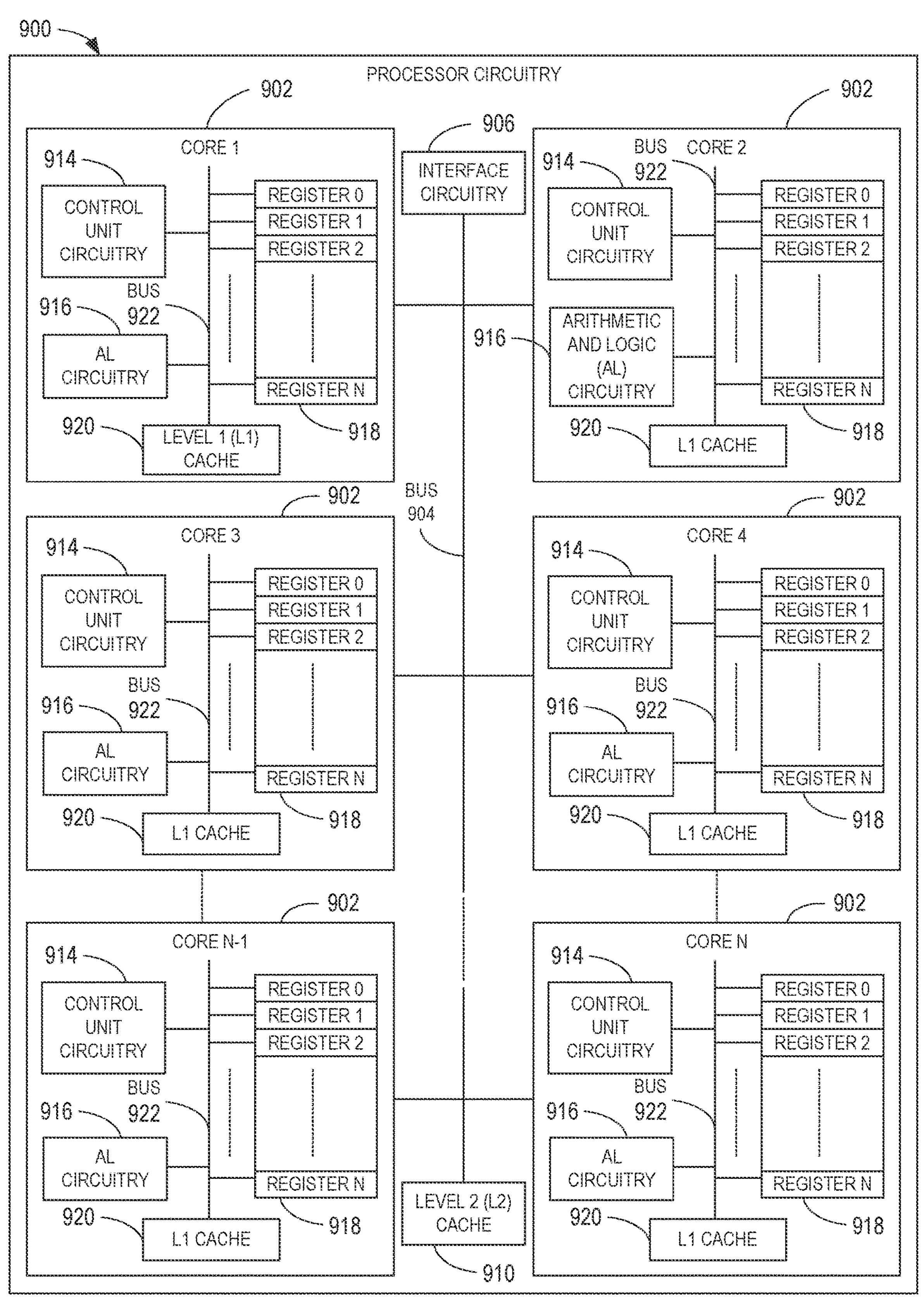
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIG. 7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 920 may implement at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
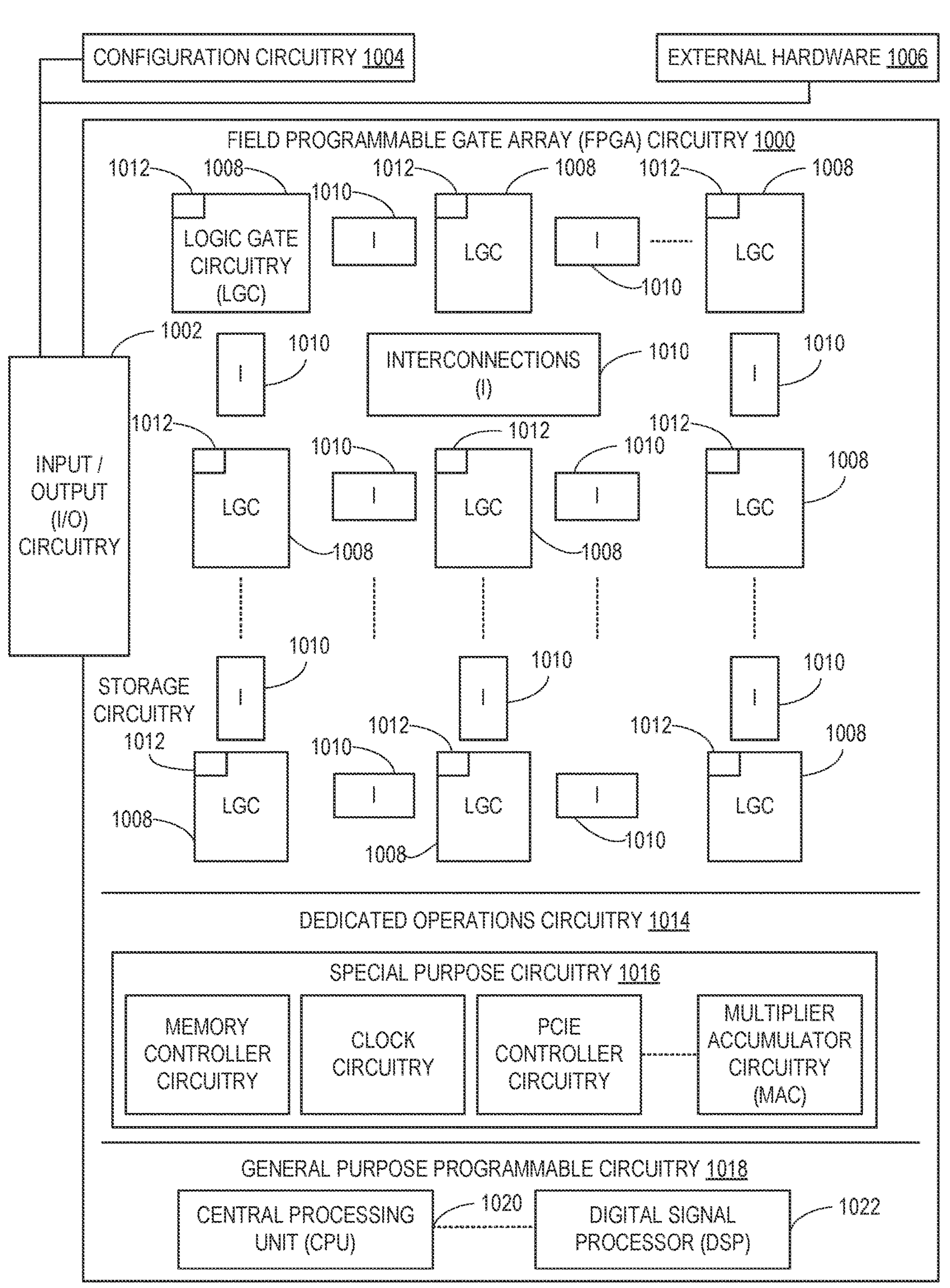
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowchart of FIG. 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowchart of FIG. 7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowchart of FIG. 7. As such, the FPGA circuitry 1000 may be structured to effectively instantiate some or all of the machine readable instructions of the flowchart of FIG. 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIG. 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIG. 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowchart of FIG. 7 may be executed by one or more of the cores 902 of FIG. 9 and a second portion of the machine readable instructions represented by the flowchart of FIG. 7 may be executed by the FPGA circuitry 1000 of FIG. 10.

In some examples, the processor circuitry 812 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
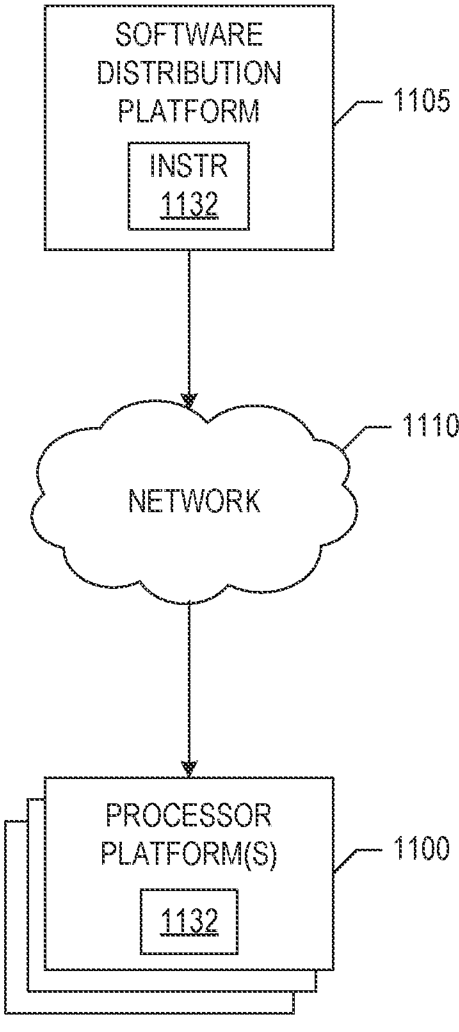
FIG. 11 is a block diagram illustrating an example software distribution platform to distribute software such as the example machine readable instructions of FIG. 8 to hardware devices owned and/or operated by third parties.

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 700 of FIG. 7, as described above. The one or more servers of the example software distribution platform 1105 are in communication with a network 1110, which may correspond to any one or more of the Internet and/or any of the example networks 150, etc., described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 700 of FIG. 7, may be downloaded to the example processor platform 800, which is to execute the machine readable instructions 832 to implement the method 700 and associated system 100. In some examples, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

In some examples, an apparatus includes means for processing an operating state of an endpoint device circuitry based on operating data of the endpoint device circuitry to evaluate suitability of the endpoint device circuitry for an update. For example, the means for processing may be implemented by processor circuitry 122, processor circuitry 112, firmware circuitry 130, etc. In some examples, the processor circuitry 112, 122 may be implemented by machine executable instructions such as that implemented by at least blocks 702, 704, 706, 708 of FIG. 77 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the processor circuitry 122, 112 is implemented by other hardware logic circuitry, hardware implemented state machines, and/or any other combination of hardware, software, and/or firmware. For example, the processor circuitry 122, 112 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, an apparatus includes means for storing a context of the endpoint device circuitry when the endpoint device circuitry is not suitable for the update. For example, the means for storing may be implemented by memory circuitry 124, etc. In some examples, the memory circuitry 124 may be implemented by machine executable instructions such as that implemented by at least block 710 of FIG. 77 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10, executing in conjunction with memory 814, 816, 817. In other examples, the memory circuitry 124 is implemented by other hardware logic circuitry, hardware implemented state machines, and/or any other combination of hardware, software, and/or firmware. For example, the memory circuitry 124 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, an apparatus includes means for installing the update at the endpoint device circuitry when the endpoint device circuitry is suitable for the update. For example, the means for installing may be implemented by processor circuitry 122, processor circuitry 112, firmware circuitry 130, etc. In some examples, the processor circuitry 122, 112 and/or firmware circuitry 130 may be implemented by machine executable instructions such as that implemented by at least blocks 712-728 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the processor circuitry 122, 112 and/or the firmware circuitry 130 is implemented by other hardware logic circuitry, hardware implemented state machines, and/or any other combination of hardware, software, and/or firmware. For example, the processor circuitry 122, 112 and/or the firmware circuitry 130 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

From the foregoing, it will be appreciated that example systems, methods, apparatus, and articles of manufacture have been disclosed that provide improved remote management of an endpoint computing device and associated update and recovery. The disclosed systems, methods, apparatus, and articles of manufacture improve the efficiency of using a computing device by gathering operating data of the endpoint device, determining an operating state and/or environment of the endpoint device, and managing an update of the endpoint device safely and efficiently to avoid damage to the endpoint device or its software, data, etc., while facilitating remote update and management of the endpoint device. The disclosed systems, methods, apparatus, and articles of manufacture are accordingly directed to one or more improvement(s) in the operation of a machine such as a computer or other electronic and/or mechanical device.

As such, certain examples improve the function of processor circuitry through remote update control based on an operating or boot condition of the endpoint device circuitry. Certain examples improve the function of memory circuitry through introduction of a boot script table including state and/or context information for an operating state of the endpoint device circuitry in an update, wherein the saved information enables resumption of the endpoint device circuitry at the saved state. Certain examples improve the function of processor circuitry through configuration of a watchdog timer to manage an update before the endpoint device circuitry reaches a critical condition such as overheating, power loss, etc. Certain examples improve the function of an operating system through interaction with a remote endpoint management console circuitry to manage a future, pending, and/or postponed update of the endpoint device circuitry.

Further aspects of the present disclosure are provided by the subject matter of the following clauses:

Example 1 is an apparatus including: interface circuitry to communicate with endpoint device circuitry; and processor circuitry to execute instructions to at least: query the endpoint device circuitry via the interface circuitry to obtain operating data associated with the endpoint device circuitry; determine an operating state of the endpoint device circuitry based on the operating data; when the operating state is not suitable for an update, trigger a save of a context of the endpoint device circuitry; and, when the operating state is suitable for the update, trigger installation of the update at the endpoint device circuitry.

Example 2 includes Example 1, wherein the operating data includes at least one of a temperature or a power level.

Example 3 includes Example 1, wherein the processor circuitry is to wake up the endpoint device circuitry.

Example 4 includes Example 1, wherein the processor circuitry is to activate a watchdog timer at the endpoint device circuitry to detect a user or enter a low power mode in response to expiration of the watchdog timer.

Example 5 includes Example 1, wherein the processor circuitry is to save the context in a boot script table.

Example 6 includes Example 1, further including first operating system services to interact with second operating system services at the endpoint device circuitry.

Example 7 is at least one computer-readable storage medium including instructions which, when executed, cause at least one processor to at least: determine an operating state of an endpoint device circuitry based on operating data of the endpoint device circuitry; evaluate suitability of the endpoint device circuitry for an update based on the operating state of the endpoint device circuitry; when the endpoint device circuitry is not suitable for the update, trigger a save of a context of the endpoint device circuitry; and, when the endpoint device circuitry is suitable for the update, trigger installation of the update at the endpoint device circuitry.

Example 8 includes Example 7, wherein the instructions, when executed, cause the at least one processor to trigger a watchdog timer during the update, the watchdog timer to set a period to detect user presence.

Example 9 includes Example 8, wherein the instructions, when executed, cause the at least one processor to, when user presence is detected before expiration of the period of the watchdog timer, facilitate completion of the update.

Example 10 includes Example 8, wherein the instructions, when executed, cause the at least one processor to, when user presence is not detected before expiration of the period of the watchdog timer, facilitate saving of the context and entering a low power mode.

Example 11 includes Example 10, wherein the instructions, when executed, cause the at least one processor to resume the update using the saved context upon exit from the low power mode.

Example 12 includes Example 7, wherein the operating data includes at least one of a temperature or a power level, and wherein the instructions, when executed, cause the at least one processor to save the context in a boot script table of a memory of the endpoint device circuitry.

Example 13 is a method for remote update management, the method including: determining an operating state of an endpoint device circuitry based on operating data of the endpoint device circuitry; evaluating suitability of the endpoint device circuitry for an update based on the operating state of the endpoint device circuitry; when the endpoint device circuitry is not suitable for the update, triggering a save of a context of the endpoint device circuitry; and, when the endpoint device circuitry is suitable for the update, triggering installation of the update at the endpoint device circuitry.

Example 14 includes Example 13, further including triggering a watchdog timer during the update, the watchdog timer to set a period to detect user presence.

Example 15 includes Example 14, further including, when user presence is detected before expiration of the period of the watchdog timer, facilitating completion of the update.

Example 16 includes Example 14, further including, when user presence is not detected before expiration of the period of the watchdog timer, facilitating saving of the context and entering a low power mode.

Example 17 includes Example 16, further including resuming the update using the saved context upon exit from the low power mode.

Example 18 includes Example 13, wherein the operating data includes at least one of a temperature or a power level, and wherein saving the context includes saving the context in a boot script table of a memory of the endpoint device circuitry.

Example 19 is an apparatus including: means for processing an operating state of an endpoint device circuitry based on operating data of the endpoint device circuitry to evaluate suitability of the endpoint device circuitry for an update; means for storing a context of the endpoint device circuitry when the endpoint device circuitry is not suitable for the update; and means for installing the update at the endpoint device circuitry when the endpoint device circuitry is suitable for the update.

Example 20 includes example 19, further including means for interfacing with an external circuitry to facilitate the update.

Example 21 is an endpoint device apparatus including: a sensor to measure operating data; embedded controller circuitry to communicate with the sensor to capture the operating data; firmware circuitry to query the sensor via the embedded controller; and processor circuitry to determine an operating state based on the operating data obtained as a result of the query in comparison to the update, the operating state to be sent to an external circuitry to govern application of the update, wherein, when external circuitry determines that the operating state does not support the update, the external circuitry triggers a save of a context, and, when the external circuitry determines that operating state does support the update, the update is installed.

Example 22 includes Example 21, wherein the external circuitry is to trigger a watchdog timer in the processor circuitry during the update, the watchdog timer to set a period to detect user presence.

Example 23 includes Example 22, wherein at least one of the processor circuitry or the firmware circuitry is to complete the update when user presence is detected before expiration of the period of the watchdog timer.

Example 24 includes Example 22, wherein at least one of the processor circuitry or the firmware circuitry is to save the context and enter a low power mode when user presence is not detected before expiration of the period of the watchdog timer.

Example 25 includes Example 22, wherein the operating data includes at least one of a temperature or a power level.

Example 26 includes Example 25, wherein the temperature includes at least one of a processor circuitry temperature or a platform temperature of the endpoint device apparatus.

Example 27 includes Example 21, wherein the context is to be saved in a boot script table.

Example 28 includes Example 21, further including first operating system services to interact with second operating system services at the external circuitry.

Example 29 includes any of Examples 1-28, further including a network.

Example 30 includes Example 29, wherein the network is a cloud-based network.

Example 31 includes any of Examples 1-30, wherein embedded controller circuitry includes a system on a chip to communicate with one or more sensors to capture operating data.

Example 32 includes any of Examples 1-31, further including re-evaluating the operating state.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the examples of this patent.

What is claimed is:

1. An apparatus comprising:

at least one interface circuit to communicate with at least one endpoint device circuit;

instructions; and at least one processor circuit to execute instructions to at least:

query the at least one endpoint device circuit via the at least one interface circuit to obtain from the at least one endpoint device circuit operating data representing a measured temperature from a sensor of the at least one endpoint device circuit and a measured battery level of a battery of the at least one endpoint device circuit;

determine an operating state of the at least one endpoint device circuit based on the operating data and a threshold, the operating state being suitable for installation of an update when the threshold is satisfied by the operating data and the operating state being not suitable for the update when the threshold is not satisfied by the operating data;

when the operating state is not suitable for the update, trigger saving of a context of the at least one endpoint device circuit, the context to enable the update when the operating state becomes suitable for the update; and when the operating state is suitable for the update, trigger installation of the update at the at least one endpoint device circuit, wherein, when a failure in initialization for the update is detected, the at least one processor circuit is to activate a watchdog timer at the at least one endpoint device circuit to i) execute a system recovery in response to detecting a user within a period of the watchdog timer or ii) enter a low power mode to suspend the system recovery in response to expiration of the watchdog timer.

2. The apparatus of claim 1, wherein, when the operating data includes the temperature, the threshold is a temperature limit, and wherein, when the operating data includes the battery level, the threshold is an available power threshold.

3. The apparatus of claim 1, wherein the at least one processor circuit is to wake up the at least one endpoint device circuit.

4. The apparatus of claim 1, wherein the at least one processor circuit is to activate a watchdog timer at the at least one endpoint device circuit to detect a user or enter a low power mode in response to expiration of the watchdog timer.

5. The apparatus of claim 1, wherein the at least one processor circuit is to save the context in a boot script table.

6. The apparatus of claim 1, further including first operating system services to interact with second operating system services at the at least one endpoint device circuit.

7. At least one computer-readable storage medium comprising instructions which, when executed, cause at least one processor circuit to at least:

determine an operating state of at least one endpoint device circuit based on operating data of the at least one endpoint device circuit and a threshold, the operating data representing a measured temperature from a sensor of the at least one endpoint device circuit and a measured battery level of a battery of the at least one endpoint device circuit;

evaluate suitability of the at least one endpoint device circuit for installation of an update based on the operating state of the at least one endpoint device circuit, the operating state being suitable for the update when the threshold is satisfied by the operating data and the operating state being not suitable for the update when the threshold is not satisfied by the operating data;

when the at least one endpoint device circuit is not suitable for the update, trigger saving of a context of the at least one endpoint device circuit, the context to enable a resumption of the update when the operating state becomes suitable for the update; and when the at least one endpoint device circuit is suitable for the update, trigger installation of the update at the at least one endpoint device circuit, wherein, when a failure in initialization for the update is detected, the at least one processor circuit is to activate a watchdog timer at the at least one endpoint device circuit to i) execute a system recovery in response to detecting a user within a period of the watchdog timer or ii) enter a low power mode to suspend the system recovery in response to expiration of the watchdog timer.

8. The at least one computer-readable storage medium of claim 7, wherein the instructions, when executed, cause the at least one processor circuit to, when the failure in initialization for the update is not detected and when user presence is detected before expiration of the period of the watchdog timer, facilitate completion of the update.

9. The at least one computer-readable storage medium of claim 7, wherein the instructions, when executed, cause the at least one processor circuit to, when the failure in initialization for the update is not detected and when user presence is not detected before expiration of the period of the watchdog timer, facilitate saving of the context and entering the low power mode.

10. The at least one computer-readable storage medium of claim 9, wherein the instructions, when executed, cause the at least one processor circuit to resume the update using the saved context upon exit from the low power mode.

11. The at least one computer-readable storage medium of claim 7, wherein the instructions, when executed, cause the at least one processor circuit to save the context in a boot script table of a memory of the at least one endpoint device circuit.

12. A method for remote update management, the method comprising:

determining an operating state of at least one endpoint device circuit based on operating data of the at least one endpoint device circuit and a threshold, the operating data representing a measured temperature from a sensor of the at least one endpoint device circuit and a measured battery level of a battery of the at least one endpoint device circuit;

evaluating suitability of the at least one endpoint device circuit for installation of an update based on the operating state of the at least one endpoint device circuit, the operating state being suitable for the update when the threshold is satisfied by the operating data and the operating state being not suitable for the update when the threshold is not satisfied by the operating data;

when the at least one endpoint device circuit is not suitable for the update, triggering saving of a context of the at least one endpoint device circuit, the context to enable the update when the operating state becomes suitable for the update;

when the at least one endpoint device circuit is suitable for the update, triggering installation of the update at the at least one endpoint device circuit; and when a failure in initialization for the update is detected, activating a watchdog timer at the at least one endpoint device circuit to i) execute a system recovery in response to detecting a user within a period of the watchdog timer or ii) enter a low power mode to suspend the system recovery in response to expiration of the watchdog timer.

13. The method of claim 12, further including, when the failure in initialization for the update is not detected and when user presence is detected before expiration of the period of the watchdog timer, facilitating completion of the update.

14. The method of claim 12, further including, when the failure in initialization for the update is not detected and when user presence is not detected before expiration of the period of the watchdog timer, facilitating saving of the context and entering a low power mode.

15. The method of claim 14, further including resuming the update using the saved context upon exit from the low power mode.

16. The method of claim 12, wherein saving the context includes saving the context in a boot script table of a memory of the at least one endpoint device circuit.

17. An apparatus comprising:

means for processing an operating state of at least one endpoint device circuit based on operating data of the at least one endpoint device circuit and a threshold to evaluate suitability of the at least one endpoint device circuit for installation of an update, the operating data representing a measured temperature and a measured battery level, the operating state being suitable for the update when the threshold is satisfied by the operating data and the operating state being not suitable for the update when the threshold is not satisfied by the operating data;

means for storing a context of the at least one endpoint device circuit when the at least one endpoint device circuit is not suitable for the update, the context to enable the update when the operating state becomes suitable for the update; and means for installing the update at the at least one endpoint device circuit when the at least one endpoint device circuit is suitable for the update, wherein, when a failure in initialization for the update is detected, the means for processing is to activate a watchdog timer at the at least one endpoint device circuit to i) execute a system recovery in response to detecting a user within a period of the watchdog timer or ii) enter a low power mode to suspend the system recovery in response to expiration of the watchdog timer.

18. The apparatus of claim 17, further including means for interfacing with at least one external circuit to facilitate the update.

* * * * *